(12) United States Patent
Jachner

(10) Patent No.: US 7,676,550 B1
(45) Date of Patent: Mar. 9, 2010

(54) MULTIPLE ACCESS PRESENCE AGENT

(75) Inventor: Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 616 days.

(21) Appl. No.: 11/398,111

(22) Filed: Apr. 5, 2006

(51) Int. Cl.
*G06F 15/16* (2006.01)

(52) U.S. Cl. .................. 709/217; 709/203

(58) Field of Classification Search .......... 709/203, 709/217, 219, 220, 229
See application file for complete search history.

(56) References Cited

U.S. PATENT DOCUMENTS

2007/0061396 A1* 3/2007 Morris .............. 709/203
2007/0073889 A1* 3/2007 Morris .............. 709/229

* cited by examiner

*Primary Examiner*—Ramy M Osman
*Assistant Examiner*—Marshall McLeod
(74) *Attorney, Agent, or Firm*—Garlick Harrison & Markison

(57) ABSTRACT

A multiple access presence agent that collects and stores presence information on a presentity from presence contributors is configured to define access rules for each of the presence contributors, in which the access rules define respective rights and privileges of the presence contributors to the presence information of the presentity. The multiple access presence agent is further capable of authenticating one of the presence contributors to determine the access rules associated with that presence contributor, and in response to a valid authentication, enabling access to the presence information of the presentity by that presence contributor based on the access rules associated with that presence contributor.

14 Claims, 4 Drawing Sheets

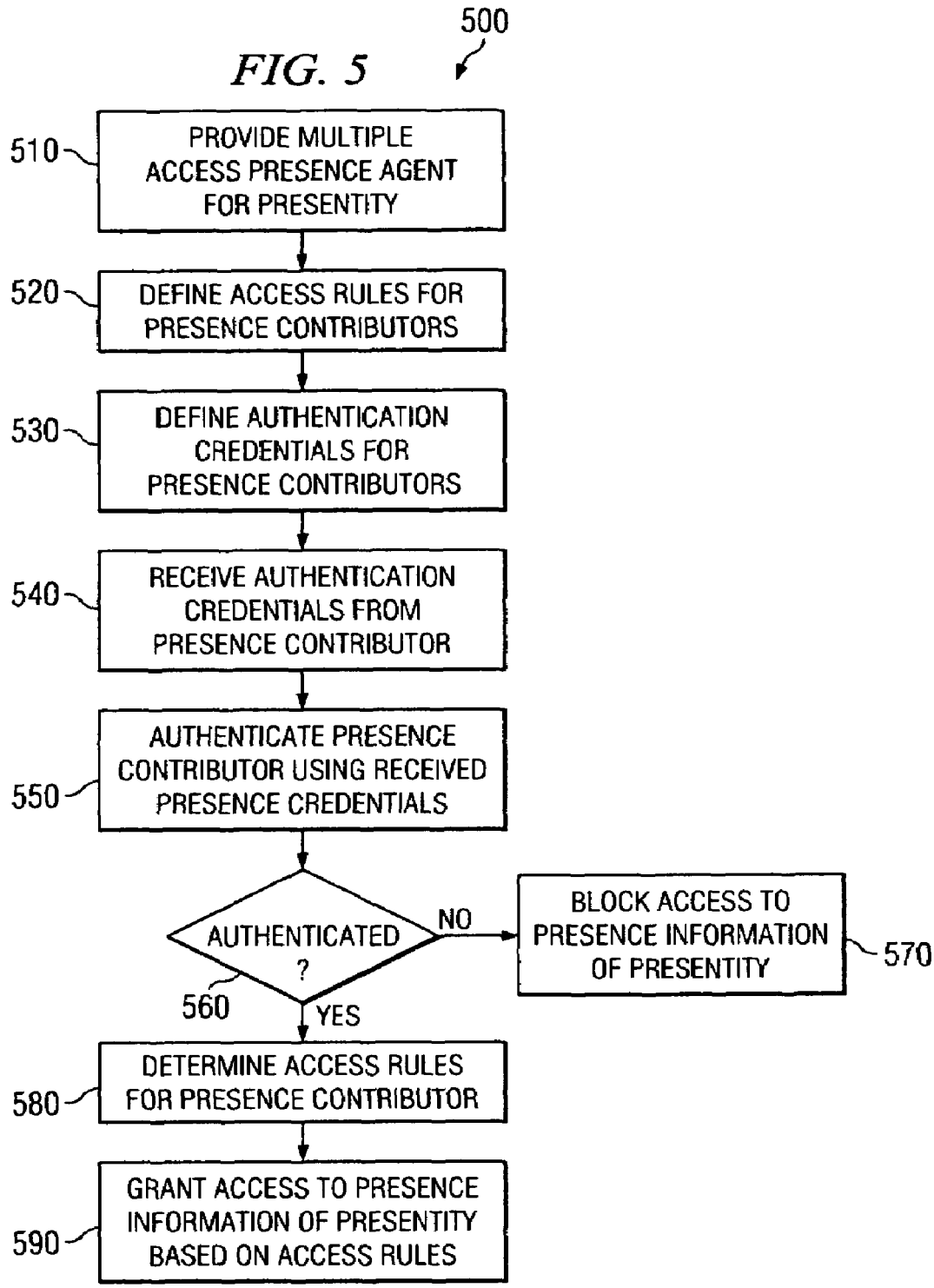

MULTIPLE ACCESS PRESENCE AGENT

BACKGROUND OF THE INVENTION

1. Technical Field of the Invention

The present invention relates in general to a presence-based communication system, and in particular, to a multiple access presence agent.

2. Description of Related Art

Presence-based interactive communication systems enable presentities (e.g., users, services, devices and/or facilities) to publish, in real-time, their presence information, such as the availability and current status of the presentity devices/applications, to presence watchers (e.g., users, services, devices and/or facilities). The presence information can be used, for example, to assist the watchers in establishing real-time voice, text and/or multimedia communication sessions with the presentities.

Existing presence systems incorporate presence servers to manage the presence information for a plurality of presentities. Within the presence server are a number of presence agents, each responsible for setting, storing and communicating the presence state of a particular presentity. Presence agents automatically receive updated presence information from various presence sources, such as telephone applications, instant messaging applications and calendar applications, and aggregate the received presence information to reflect the presence state of the presentity. For example, when a presentity initiates or receives a voice call on his or her desktop phone, the presence agent is notified and changes the presence state of the presentity to "On the Phone."

Access to presence agents is secured, typically by user name and password. Upon valid authentication, users have full access rights to the presence information of the presentity. For example, an authorized user may set the presence state of the presentity, view buddy list presence information associated with the presentity, set presentity preferences and perform any other presence-related function. Thus, for example, if a manager presentity provides his/her user name and password to an administrative assistant, that administrative assistant will have full access rights and privileges to the presence information of the manager presentity. However, in some situations, the manager presentity may want to limit the ability of the administrative assistant to view/change the presence information of the presentity. As an example, the manager presentity may want the administrative assistant to have access to only the business portion of the presence information, and not to any personal presence information associated with the manager presentity. Therefore, what is needed is a multiple access presence agent capable of providing different access privileges to different users.

SUMMARY OF THE INVENTION

Embodiments of the present invention provide a multiple access presence agent for use in a presence server. The multiple access presence agent collects and stores presence information on a presentity from presence contributors. In addition, the multiple access presence agent is configured to define access rules for each of the presence contributors, in which the access rules define respective rights and privileges of the presence contributors to the presence information of the presentity. The multiple access presence agent is further capable of authenticating one of the presence contributors to determine the access rules associated with that presence contributor, and in response to a valid authentication, enabling access to the presence information of the presentity by that presence contributor based on the access rules associated with that presence contributor. In an exemplary embodiment, the presentity represents a user, a group of users, an application, a device or a facility, while the presence contributors include one or more of a user, a group of users, an application, a device and a facility.

In one embodiment, the multiple access presence agent operates to filter the presence information of the presentity based on the access rules associated with a particular presence contributor and to provide filtered presence information to that particular presence contributor. In another embodiment, the multiple access presence agent operates to enable a particular presence contributor to update the presence information of the presentity based on the access rules associated with that presence contributor. In a further embodiment, the multiple access presence agent operates to enable a particular presence contributor to define preference information associated with the presence information of the presentity based on the access rules associated with that particular presence contributor.

In an additional embodiment, the multiple access presence agent assigns authentication credentials to each of the presence contributors for use in authenticating the presence contributors. Examples of authentication credentials include, but are not limited to, a username and password, a time variable password and a secure device identifier.

BRIEF DESCRIPTION OF THE DRAWINGS

A more complete understanding of the present invention may be obtained by reference to the following detailed description when taken in conjunction with the accompanying drawings wherein:

FIG. 5 is a flowchart illustrating an exemplary process for operating a multiple access presence agent, in accordance with embodiments of the present invention.

DETAILED DESCRIPTION OF THE DRAWINGS

Figure 1:
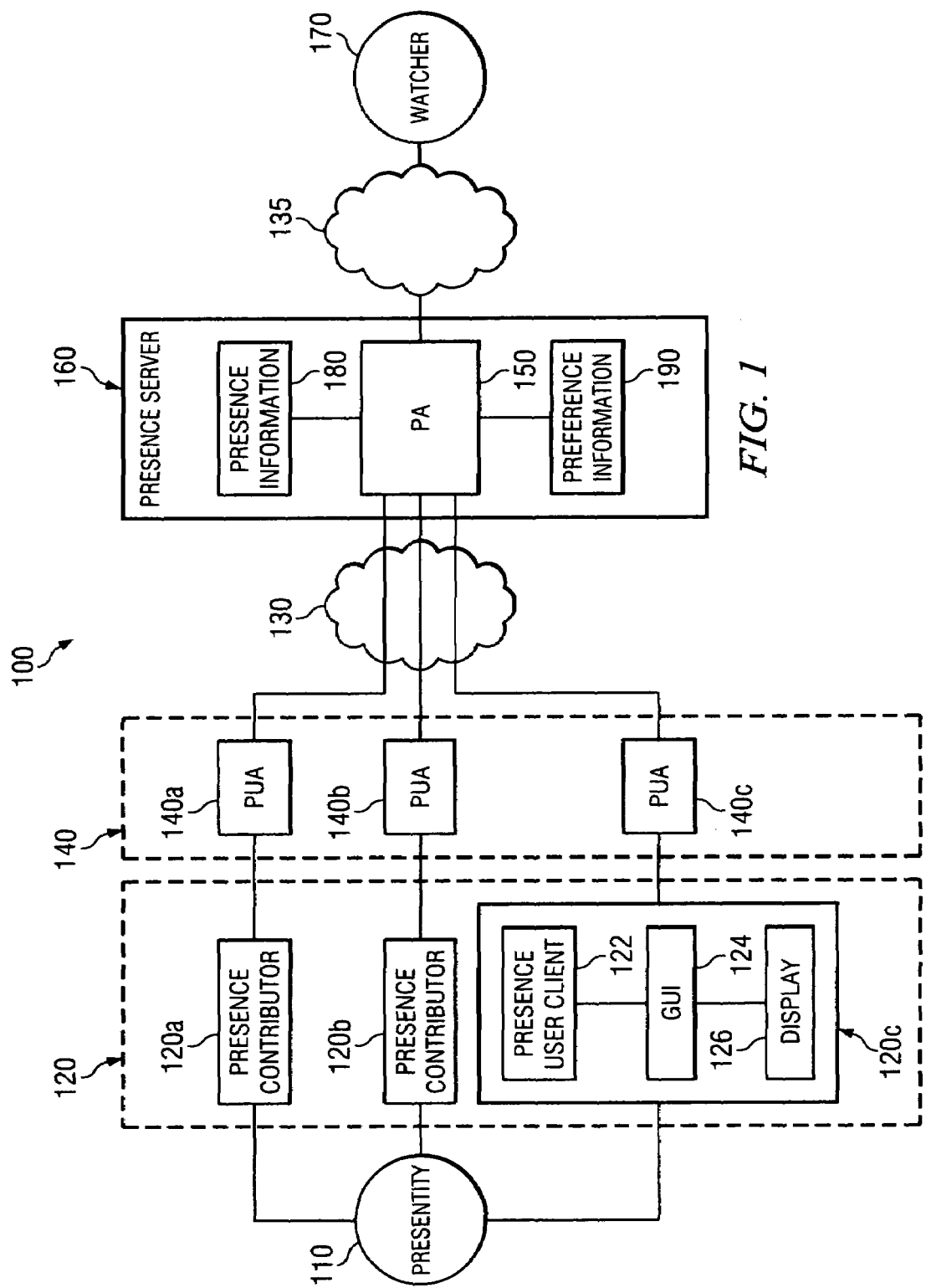
FIG. 1 illustrates an exemplary presence system in accordance with embodiments of the present invention.

Referring to FIG. 1, there is illustrated an exemplary presence system 100 capable of implementing various embodiments of the present invention. The presence system 100 includes one or more presentities (one of which is shown for convenience) 110, one or more presence user agents (PUAs) 140, a presence agent 150, a presence server 160 and one or more watchers 170 (one of which is shown for convenience) of the presentity 110. Examples of presentities 110 and watchers 170 include, but are not limited to, a person (e.g., user, administrator, manager or personnel), a group of people, a service (e.g., software application or data), a device or equipment (e.g., computer, fax machine or copy machine) and a facility (e.g., a room, an office or a building).

The presentity 110 provides presence information indicating the presentity's presence state to the presence system 100 via the presence user agents (PUAs) 140 associated with the presentity 110. Each PUA 140 represents an application that independently generates a component of the overall presence information for a presentity 110. In an exemplary embodiment, each of the PUAs 140a-c interfaces with a respective presence contributor 120a-c to provide a portion of the presence information 180 of the presentity 110 to the presence system 100. Examples of presence contributors 120a-c include, but are not limited to, devices (e.g., telephone, printer or fax machine), services, software applications, facilities and users (e.g., user presentity, administrator, personnel and other users). Each PUA 140a-c receives presence information either directly from the associated presence contributor 120a-c or through a system with knowledge of the presence state associated with the presence contributor 120a-c.

For example, as shown in FIG. 1, one of the presence contributors 120c is a user-operated physical communications device capable of sending and/or receiving communications over a communications network 130. Examples of such terminals 120c include, but are not limited to, a desktop phone, a laptop computer, a personal computer, a cell phone, a PDA and other user-operated communication devices. In one embodiment, the PUA 140c is included within the terminal 120c itself to enable the presentity 110 or another user to generate presence information on the terminal 120c and/or display the presentity presence information on the terminal 120c. In another embodiment, the PUA 140c is located within a network device or the communications network 130 to receive presence information from the terminal 120c. In either embodiment, terminal 120c may include a presence user client 122 for interfacing with the presence user agent 140c and a graphical user interface 124 for displaying the real-time presence information on a display 126 of the terminal 120c in the form of icons and/or text strings. In addition, the graphical user interface 124 may also include buttons that enable the presentity 110 or other user to invoke an action, such as updating the presence information 180 of the presentity 110 via the respective PUA 140c.

However, in general, the PUAs 140 represent applications (e.g., software programs) running on one or more physical communication devices, such as a user-operated terminal 120c, a computer network server, a telephony server (e.g., a circuit switch, IP router, gateway, etc.), a web server or any other networked device (e.g., printer, fax machine, etc.). Thus, in general, each PUA 140 includes any hardware, software, firmware, or combination thereof for providing presence information to the presence system 100. As an example, each PUA 140 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein.

Typically, a PUA 140 generates presence information when a change in presence state occurs. Examples of changes in presence state include, but are not limited to, turning on and off a terminal 120c, modifying the registration from a terminal 120c, changing the instant messaging status on a terminal 120c, operating a device (e.g., sending a fax, receiving a fax, queuing a print job to a printer, etc.) and requesting or initiating a service (e.g., ordering room service, initiating Internet access, activating voice mail, etc.). As an example, when a presentity initiates or answers a phone call on a terminal 120c, the PUA 140c associated with the terminal 120c updates the presentity's presence state to "On the Phone."

The presence information from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110.

The PA 150 aggregates the presence information from each of the sources (e.g., PUA's 140) and maintains the current complete presence information for the presentity 110. The presence information 180 indicates, for example, the availability of the presentity, the current activity of the presentity, the local time where the presentity is located, the current location of the presentity, the current status of the active terminals and/or applications running on active terminals and the current status of any services/applications associated with the presentity.

The PA 150 is further operable to provide the presence information 180 to one or more watchers 170 who have subscribed to the presence service of the presentity 110 via a communication network 135. In FIG. 1, the communications networks 130 and 135 represent any type of network over which media (e.g., circuit-switched or packet-switched voice or data) may be sent. For example, the communications networks 130 and 135 can include the Public Switched Telephone Network (PSTN), Public Land Mobile Network (PLMN), one or more private local area networks (LANs), the Internet and/or any other type or combination of networks.

The presence server 160 is a physical entity that can operate as either the PA 150 or as a proxy server for routing requests from watchers 170 to the PA 150. The presence server 160 stores the presence information 180 for a plurality of presentities 110. Thus, the PA 150, in combination with the presence server 160, is operable to receive presence information of the presentity 110 from the PUAs 140, receive requests from watchers 170 for the presence information and provide the presence information to the watcher(s) 170. When acting as a PA 150, the presence server 160 can also be co-located with a PUA 140.

The presence server 160 further stores preference information 190 for the presentities 110 and watchers 170 of the presence system 100. For example, the preference information 190 can include both presentity preference information (e.g., privacy filters) set by the presentity 110 for each watcher 170 and watcher preference information (e.g., watcher filters) set by each watcher 170 for presentities 110. The preference information 190 operates to filter the presence information 180 of a presentity 110 provided to a watcher 170 to accommodate privacy concerns, prioritization requirements, viewing requirements, administrator policies and security considerations.

The presence system 100 uses a presence protocol to provide the presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union—Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a watcher 170 to transmit a SUBSCRIBE request for presence information relating to a particular presentity 110 to the presence server 160 that maintains the presence information for the presentity 110. In operation, the presence server 160 and PA 150 may be co-located with the SIP proxy/registrar for efficiency purposes.

Figure 2:
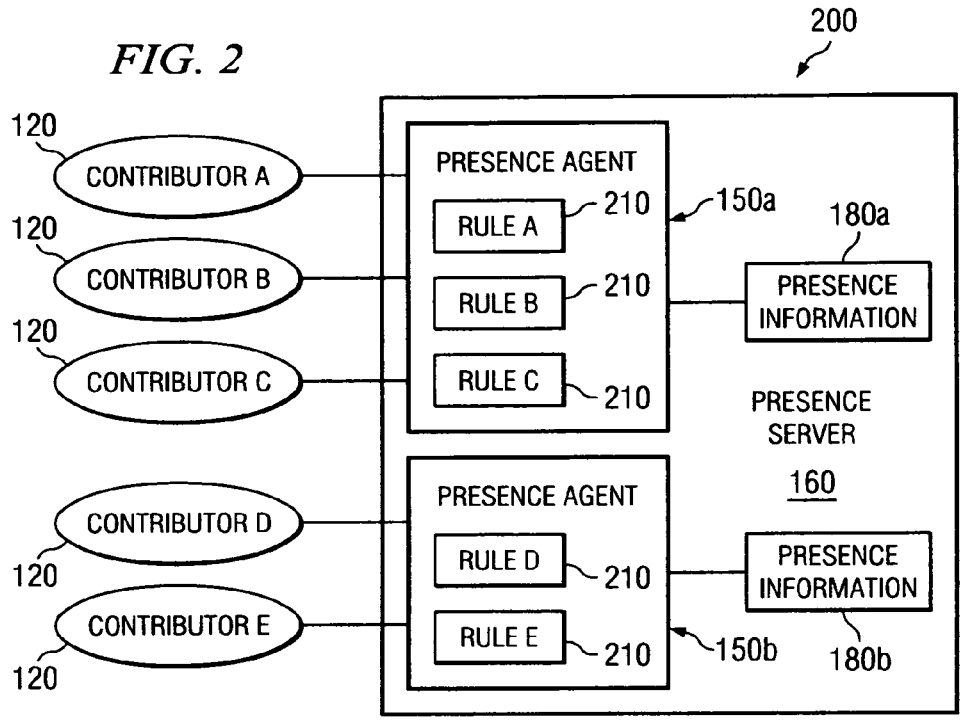
FIG. 2 illustrates exemplary multiple access presence agents, in accordance with embodiments of the present invention.

FIG. 2 illustrates an exemplary architecture 200 including multiple access presence agents 150a and 150b, in accordance with embodiments of the present invention. Multiple access presence agent 150a is configured to set, store and communicate the presence information 180a of a first presentity, whereas multiple access presence agent 150b is configured to set, store and communicate the presence information 180b of a second presentity. Multiple access presence agents 150a and 150b may each be accessed by multiple presence contributors 120, each with different rights and privileges granted thereto. For example, multiple access presence agent 150a is accessible by presence contributors A, B and C, while multiple access presence agent 150b is accessible by presence contributors D and E.

As described above, a presence contributor 120 may be a device, a service, a software application, a facility or a user. For example, if the presentity associated with multiple access presence agent 150a is a room within a hotel, various presence contributors 120 can include a service associated with the room (e.g., in-room dining service, housekeeping service, billing service, etc.), a device associated with the room (e.g., mini-bar, telephone/PBX, pay-per-view box, etc.) and a user associated with the room (e.g., guest, hotel administrator, housekeeping personnel, etc.). As another example, if the presentity associated with multiple access presence agent 150b is a user/subscriber, various presence contributors 120 can include an application (e.g., a telephone application, instant messaging application, calendar application, etc.), a device (e.g., a cell phone, desktop phone, PDA, computer, circuit switch, router, etc.) and a user (e.g., subscriber, administrator, assistant, other personnel, etc.).

To restrict access to the presence information 180a and 180b managed by the multiple access presence agents 150a and 150b, each multiple access presence agent 150a and 150b is capable of defining access rules 210 for each of the presence contributors 120. For example, as shown in FIG. 2, multiple access presence agent 150a has defined access rule A for presence contributor A, access rule B for presence contributor B and access rule C for presence contributor C. Likewise, multiple access presence agent 150b has defined access rule D for presence contributor D and access rule E for presence contributor E. Each access rule 210 may be originally defined by the presentity, an administrator of the presence system or other user, and stored in the multiple access presence agents 150a and 150b.

The access rules 210 associated with each of the presence contributors 120 define respective rights and privileges of the presence contributors 120 to access the presence information 180a, 180b of the respective presentity. For example, in one embodiment, the access rules 210 may define the scope and/or ability of the presence contributor 120 to access/view the presence information 180 of the presentity. Thus, the access rules 210 for a particular presence contributor 120 (e.g., contributor A) may include one or more filters that operate to filter the presence information 180a of the presentity before providing the filtered presence information 180a to presence contributor A. As an example, access rule A may allow presence contributor A to access/view some or all of the presentity's presence information 180a and/or some or all of the presentity's buddies' presence information (e.g., an assistant has access to professional contacts, but not to personal contacts on the manager's buddy list).

In another embodiment, the access rules 210 may define the scope and/or ability of the presence contributor 120 to set/change the presence information 180 of the presentity. Thus, the access rules 210 for a particular presence contributor 120 (e.g., contributor B) may put limits on the ability of presence contributor B to update the presence information 180a of the presentity. As an example, access rule B may allow presence contributor B to control only certain elements of the presence state of the presentity (e.g., housekeeping personnel may be able to update whether a room has been cleaned, but cannot make changes to a guest bill).

In yet another embodiment, the access rules 210 may define the scope and/or ability of the presence contributor 120 to set/change preference information for the presentity. Thus, the access rules 210 for a particular presence contributor 120 (e.g., contributor C) may limit the ability of presence contributor C to configure preferences for the presentity. As an example, access rule C may prevent presence contributor C from limiting the presence information 180a provided to all watchers except presence contributor C.

In addition, the access rules 210 may define the access priority associated with each presence contributor 120. For example, in one embodiment, the access rules 210 may enable multiple presence contributors 120 to simultaneously access the presence information 180 of the presentity, each with different rights and privileges. In another embodiment, the access rules 120 may define a hierarchical access of the presence contributors 120 to the presence information 180 of the presentity. For example, presence contributor B may be denied access to the presence information 180a of the presentity while presence contributor A is accessing the presence information 180a of the presentity.

The access rules 210 further include authentication credentials associated with each presence contributor 120 that are used by the multiple access presence agents 150a and 150b to authenticate the presence contributors 120 and determine the access rules 210 associated with the presence contributors 120. For example, the authentication credentials may include unique usernames and passwords, a common username with unique passwords, time variable passwords supplied by tokens, secure device identifier(s) to limit access from only secure locations and/or a single sign-on. The authentication credentials for each presence contributor 120 are assigned by the presence agent 150, provided to the presence contributors 120 and maintained by the presence agent 150 for later use in authenticating the presence contributors 120.

Figure 3:
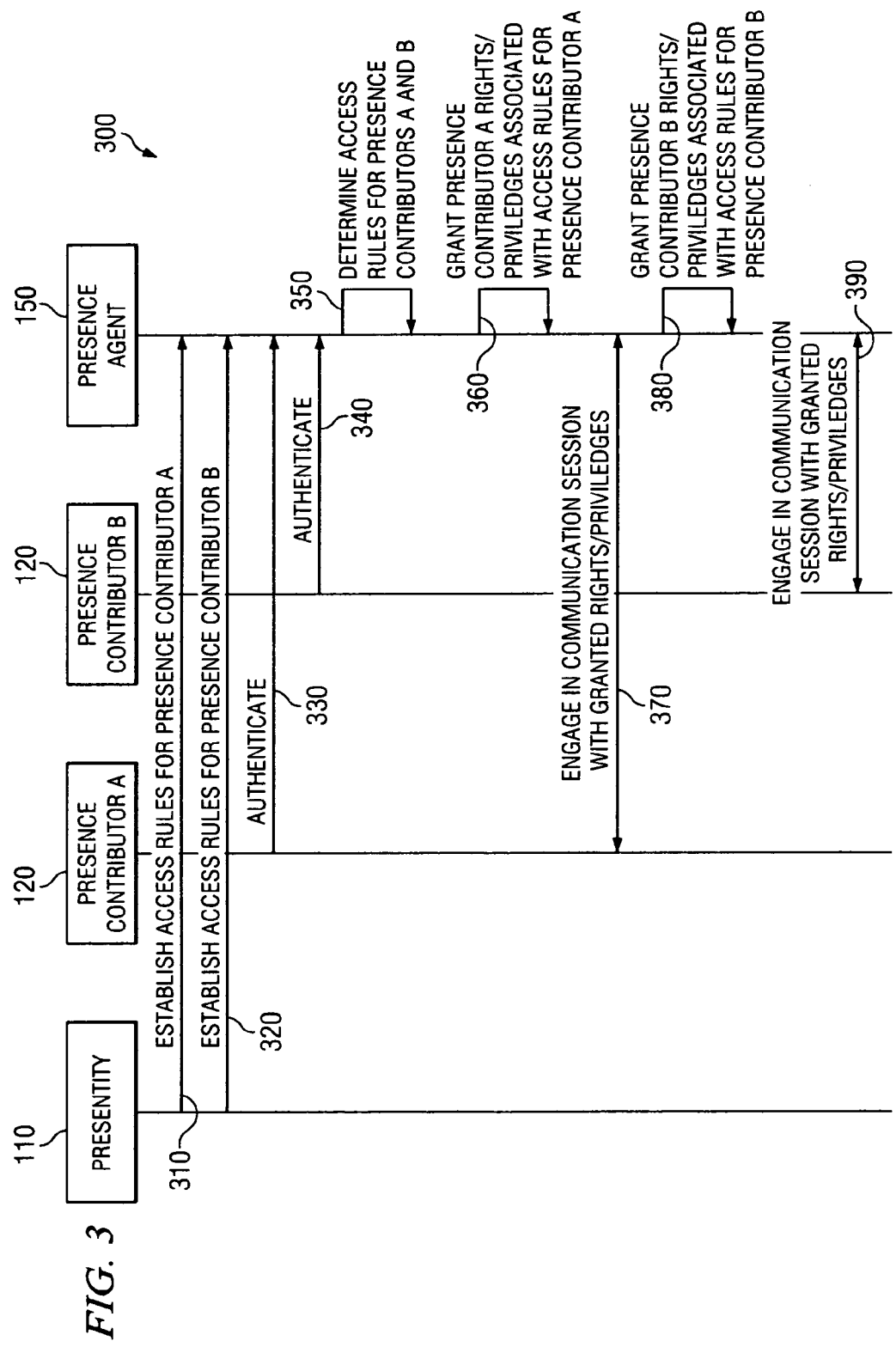
FIG. 3 illustrates an exemplary message flow for establishing different presence agent access rules for different presence contributors, in accordance with embodiments of the present invention.

FIG. 3 illustrates an exemplary message flow 300 for establishing different presence agent access rules for different presence contributors 120 in accordance with embodiments of the present invention. Initially, at 310 and 320, the presentity 110 establishes access rules and authentication credentials for both presence contributor A and presence contributor B with the presence agent 150 associated with the presentity 110. The access rules for presence contributor A define the rights and privileges that presence contributor A has to access the presence information of the presentity 110, while the access rules for presence contributor B define the rights and privileges that presence contributor A has to access the presence information of the presentity 110.

Once the access rules have been defined, at 330, presence contributor A provides its authentication credentials to the presence agent 150 to authenticate presence contributor A. In addition, at 340, presence contributor B may also provide its authentication credentials to the presence agent 150 to authenticate presence contributor B. From the authentication credentials, at 350, the presence agent 150 authenticates each presence contributor A and B and determines the access rules for each of the presence contributors.

Thereafter, at 360, the presence agent 150 grants presence contributor A the rights and privileges associated with the access rules for presence contributor A, and at 370, engages in a communication session with presence contributor A with the granted rights and privileges. During the communication session, presence contributor A may view, set and/or change presence information of the presentity and set or change preference information of the presentity based on the access rules associated with presence contributor A. At 380, the presence agent 150 grants presence contributor B the rights and privileges associated with the access rules for presence contributor B, and at 390, engages in a communication session with presence contributor B with the granted rights and privileges. During the communication session with presence contributor B, presence contributor B may view, set and/or change presence information of the presentity and set or change preference information of the presentity based on the access rules associated with presence contributor B.

Figure 4:
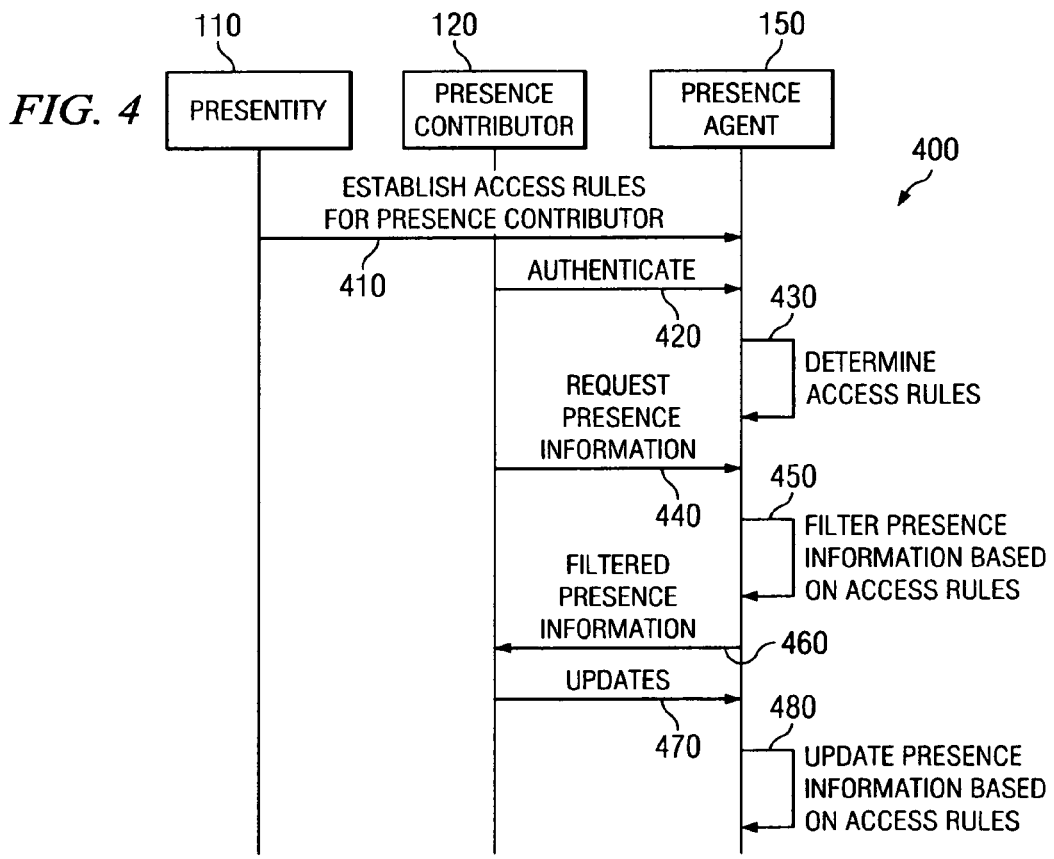
FIG. 4 illustrates an exemplary message flow for providing filtered presence information to a presence contributor based on the presence agent access rules associated with the presence contributor, in accordance with embodiments of the present invention.

FIG. 4 illustrates an exemplary message flow 400 for providing filtered presence information to a presence contributor 120 based on the presence agent access rules associated with the presence contributor 120, in accordance with embodiments of the present invention. Initially, at 410, the presentity 110 establishes access rules and authentication credentials for a presence contributor 120 with the presence agent 150 associated with the presentity 110. Again, the access rules for the presence contributor 120 define the rights and privileges that the presence contributor 120 has to access the presence information of the presentity 110. Once the access rules have been defined, at 420, the presence contributor 120 provides its authentication credentials to the presence agent 150 to authenticate the presence contributor 120. From the authentication credentials, at 430, the presence agent 150 authenticates the presence contributor 120 and determines the access rules for the presence contributor 120.

Thereafter, at 440, the presence contributor 120 requests access to the presence information of the presentity 110. In accordance with the access rules associated with the presence contributor 120, at 450, the presence agent 150 filters the presence information of the presentity 110, and at 460, provides the filtered presence information to the presence contributor 120. If the presence contributor 120 desires to make updates to the presence information of the presentity 110, at 470, the presence contributor 120 can provide updated presence information to the presence agent 150. At 480, the presence agent 150 analyzes the access rules associated with the presence contributor 120 and updates the presence information of the presentity 110 in accordance with the access rules.

FIG. 5 is a flowchart illustrating an exemplary process 500 for operating a multiple access presence agent, in accordance with embodiments of the present invention. Initially, at block 510, a multiple access presence agent is provided for the presentity in the presence server. At block 520, access rules for accessing the presence information of the presentity via the multiple access presence agent are defined for each potential contributor of the presence information. The access rules for each presence contributor define the rights and privileges of that presence contributor to access/view/set/change the presence information of the presentity. In addition, at block 530, authentication credentials are defined for each potential presence contributor to provide secure access to the presence information of the presentity based on the access rules.

Thereafter, at block 540, the authentication credentials of one of the presence contributors are received at the multiple access presence agent. At block 550, the multiple access presence agent uses the received authentication credentials to authenticate the presence contributor. If the presence contributor is not authenticated (e.g., provides incorrect authentication credentials) (N branch of block 560), the multiple access presence agent blocks the presence contributor's access to the presence information of the presentity, at block 570. However, if the presence contributor is authenticated (Y branch of block 560), the multiple access presence agent determines the access rules for the presence contributor, at block 580. Finally, at block 590, the multiple access presence agent grants the presence contributor the rights and privileges associated with the access rules for that presence contributor.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A multiple access presence agent for use in a presence server, said multiple access presence agent for collecting and storing presence information on a presentity from presence contributors, said multiple access presence agent further comprising:

means for defining access rules for each of said presence contributors, said access rules associated with each of said presence contributors defining respective rights and privileges of said presence contributors to access said presence information of said presentity after said presence contributors have provided said presence information to said presence server;

means for authenticating one of said presence contributors to determine said access rules associated with said one of said presence contributors; and means for enabling access to said presence information of said presentity by said one of said presence contributors based on said access rules associated with said one of said presence contributors; and means for enabling access further includes means for filtering said presence information of said presentity based on said access rules of said one of said presence contributors to produce filtered presence information and means for providing said filtered presence information to said one of said presence contributors; and means for enabling access further includes means for enabling said one of said presence contributors to update said presence information of said presentity based on said access rules of said one of said presence contributors; and means for enabling access further includes means for enabling said one of said presence contributors to define preference information associated with said presence information of said presentity based on said access rules of said one of said presence contributors.

2. The multiple access presence agent of claim 1, wherein said presentity represents one or more of a user, a group of users, an application, a device and a facility.

3. The multiple access presence agent of claim 2, wherein said presence contributors include one or more of a user, a group of users, an application, a device and a facility.

4. The multiple access presence agent of claim 1, wherein said means for authenticating further includes means for assigning authentication credentials to each of said presence contributors and means for receiving said authentication credentials of said one of said presence contributors to authenticate said one of said presence contributors.

5. The multiple access presence agent of claim 4, wherein said authentication credentials include a username and password, a time variable password or a secure device identifier.

6. The multiple access presence agent of claim 1, wherein said means for enabling further includes means for enabling access to said presence information of said presentity by multiple ones of said presence contributors simultaneously based on said respective access rules associated with said multiple ones of said presence contributors.

7. The multiple access presence agent of claim 1, wherein said means for enabling further includes means for providing hierarchical access by said presence contributors to said presence information of said presentity.

8. A presence system for providing multiple access rights, comprising:
a presence server for collecting and storing presence information on a plurality of presentities from presence contributors; and
a multiple access presence agent for managing said presence information for one of said presentities, said multiple access presence agent operable to establish access rules defining respective rights and privileges for each of said presence contributors to access said presence information of said one of said presentities after said presence contributors have provided said presence information to said presence server;
wherein said multiple access presence agent is further operable to authenticate one of said presence contributors to determine said access rules associated with said one of said presence contributors; and
wherein said multiple access presence agent is further operable to enable access to said presence information of said one of said presentities by said one of said presence contributors based on said access rules associated with said one of said presence contributors; and
wherein said multiple access presence agent is further operable to filter said presence information of said one of said presentities based on said access rules of said one of said presence contributors to produce filtered presence information and to provide said filtered presence information to said presence user client; and
wherein said graphical user interface is further operably coupled to said presence user client to enable said one of said presence contributors to update said presence information of said one of said presentities based on said access rules of said one of said presence contributors.

9. The presence system of claim 8, further comprising:
a presence user client associated with said one of said presence contributors operable to access said multiple access presence agent.

10. The system of claim 9, further comprising:
a terminal on which said presence user client is running, said terminal having a display and including a graphical user interface operably coupled to display said presence information of said one of said presentities on said display.

11. A method for providing a multiple access presence agent within a presence server for collecting and storing presence information on a presentity from presence contributors, comprising the steps of:
defining access rules for each of said presence contributors, said access rules associated with each of said presence contributors defining respective rights and privileges of said presence contributors to access said presence information of said presentity after said presence contributors have provided said presence information to said presence server;
authenticating one of said presence contributors to determine said access rules associated with said one of said presence contributors; and
enabling access to said presence information of said presentity by said one of said presence contributors based on said access rules associated with said one of said presence contributors; and
filtering said presence information of said presentity based on said access rules of said one of said presence contributors to produce filtered presence information; and providing said filtered presence information to said one of said presence contributors; and
enabling said one of said presence contributors to update said presence information of said presentity based on said access rules of said one of said presence contributors; and
further enabling said one of said presence contributors to define preference information associated with said presence information of said presentity based on said access rules of said one of said presence contributors.

12. The method of claim 11, wherein said authenticating further comprises the steps of:
assigning authentication credentials to each of said presence contributors; and
receiving said authentication credentials of said one of said presence contributors to authenticate said one of said presence contributors.

13. The method of claim 11, wherein said enabling access further comprises the step of:
enabling access to said presence information of said presentity by multiple ones of said presence contributors simultaneously based on said respective access rules associated with said multiple ones of said presence contributors.

14. The method of claim 11, wherein said enabling further comprises the step of:
providing hierarchical access by said presence contributors to said presence information of said presentity.

* * * * *